United States Patent [19]

Kato et al.

[11] Patent Number: 4,961,484
[45] Date of Patent: Oct. 9, 1990

[54] BRAKE DEVICE FOR VEHICLE

[75] Inventors: Yoshio Kato, Takatsuki; Ichiro Kawashima, Akashi, both of Japan

[73] Assignee: Kabushiki Kaisha Kobe Sieko Sho, Kobe, Japan

[21] Appl. No.: 340,547

[22] Filed: Apr. 19, 1989

[30] Foreign Application Priority Data

Apr. 22, 1988 [JP] Japan .................. 63-101152
Mar. 9, 1989 [JP] Japan .................... 1-57567

[51] Int. Cl.⁵ ................... F16D 33/00; B60K 41/28
[52] U.S. Cl. .................... 192/3.31; 192/3.3; 192/3.58
[58] Field of Search .......... 192/3.3, 3.31, 3.58, 192/3.63, 3.62; 74/733, 866

[56] References Cited

U.S. PATENT DOCUMENTS

| | | | |
|---|---|---|---|
| 3,805,640 | 4/1974 | Schneider et al. | 192/3.31 |
| 4,027,554 | 6/1977 | Ito et al. | 74/866 |
| 4,463,842 | 8/1984 | Redzinski | 192/3.31 |
| 4,478,322 | 10/1984 | Carlson et al. | 192/3.31 |

Primary Examiner—Rodney H. Bonck
Assistant Examiner—Andrea Pitts
Attorney, Agent, or Firm—Oblon, Spivak, McClelland, Maier & Neustadt

[57] ABSTRACT

A brake device includes a controller for inputting detection signals from an engine speed sensor, vehicle speed sensor, shift lever position sensor and engine exhaust brake sensor. When a vehicle speed upon application of engine exhaust brake is lower than a low speed set value of an effective vehicle speed corresponding to a shift lever position, a lockup clutch of a torque converter is disengaged by the controller; and when the vehicle speed is in a range from the low speed set value to a high speed set value of the effective vehicle speed, the lockup clutch is engaged by the controller; and when the vehicle speed exceeds the high speed set value, the lockup clutch is disengaged, and a transmission is down-shifted to a just lower gear range by the controller.

4 Claims, 6 Drawing Sheets

BRAKE DEVICE FOR VEHICLE

BACKGROUND OF THE INVENTION

The present invention relates to a brake device for a vehicle such as a large vehicle and a construction machinery vehicle provided with a Diesel engine, a torque converter with a lockup clutch and a power shift transmission.

In a vehicle such as a large vehicle and a construction machinery vehicle having a large gross vehicle weight, a kinetic energy during downhill running or high speed running is very large, and a braking efficiency to be effected by a service brake device only becomes insufficient. In general, such a defect is compensated by providing an auxiliary brake device such as an engine exhaust brake.

FIG. 5 shows a conventional auxiliary brake device. Referring to FIG. 5, during normal running of the vehicle, power of a Diesel engine 1 is transmitted through a torque converter 2, transmission 4 and axle 5 to tires 6, and the vehicle travels at a speed corresponding to a gear range of the transmission 4 selected by a shift lever.

During running of the vehicle as mentioned above, an engine speed $N_E$ of the engine 1 is detected by an engine speed sensor 13, and a vehicle speed V is detected by a vehicle speed sensor 14. A turbine runner speed $N_T$ of the torque converter 2 is computed according to the vehicle speed V. As shown in FIG. 7, when the turbine runner speed $N_T$ is lower than a predetermined speed a, the lockup clutch 3 is disengaged to generate slip in the torque converter 2. Thereafter, when the turbine runner speed $N_T$ becomes the predetermined speed a or more, the lockup clutch 3 is engaged to eliminate the slip in the torque converter 2 and directly transmit the power between the engine 1 and the transmission 4.

When the vehicle is braked by the engine exhaust brake during running, a magnetic valve 10 is operated by an exhaust brake switch 11 and an accelerator switch 12 interlocking with an accelerator pedal to supply a compressed air to an exhaust brake cylinder 9 and operate the cylinder 9. As a result, an exhaust brake closing valve 8 provided in an exhaust pipe 7 of the Diesel engine 1 is operated by the cylinder 9 to thereby brake the engine 1.

Upon application of the engine exhaust brake, the control of the exhaust brake is effected by the operation of the switches 11 and 12 irrespective of a gear range of the transmission 4 and an on/off state of the lockup clutch 3 in the torque converter 2.

FIG. 6 shows control characteristics among an engine speed, engine braking force and engine exhaust braking force in relation to a vehicle speed in the case that the transmission 4 is a three-speed transmission. Referring to FIG. 6, the engine speed (shown by chain lines Ia, IIa, IIIa), the engine braking force (shown by broken lines Ib, IIb, IIIb) and the engine exhaust braking force (shown by solid lines Ic, IIc, IIIc) are controlled according to each gear range.

When the turbine runner speed $N_T$ of the torque converter 2 becomes the predetermined value a or more, the lockup clutch 3 is engaged to eliminate the slip in the torque converter 2, thereby effectively applying the engine brake and the engine exhaust brake. However, when the vehicle speed V increases excessively during downhill running, for example, the power is transmitted from the tires 6 to the engine 1 because the lockup clutch 3 is engaged. As a result, the engine speed $N_E$ of the engine 1 exceeds a permissible maximum speed $N_{max}$, that is, the engine 1 overruns to cause damage of the engine 1.

Accordingly, when the vehicle speed V is excessively increased during downhill running, for example, the operator must select a low gear range having a large reduction ratio of the transmission 4, that is, manually down-shift the gear range under the effectiveness of the engine exhaust brake, so as to reduce the vehicle speed. In this manner, such down-shift operation is troublesome. Further, if the operator fails to down-shift the gear range, the vehicle runs with a high gear range at high speeds in the on-state of the lockup clutch 3. Accordingly, a large braking force of the auxiliary brake device such as engine brake and engine exhaust brake cannot be obtained, and resultantly the service brake device is excessively heated or damaged. Further, when the operator down-shifts the gear range in the on-state of the lockup clutch 3 as mentioned above, a large reduction ratio is suddenly provided in association with the effectiveness of the engine exhaust brake to cause rapid deceleration and braking. As a result, an effective range of the vehicle speed is narrowed to remarkably reduce a running efficiency. Additionally, during normal running on a horizontal road, a high speed gear range having a small reduction ratio of the transmission 4 is usually selected, and the down-shift is not carried out every time the engine exhaust brake is applied. Accordingly, the overrun of the engine 1 tends to be generated.

To prevent the overrun of the engine 1, another auxiliary brake device such as a hydraulic brake device (hydraulic retarder) 15 and an electric brake (eddy current retarder) 16 as shown by an alternate long and two short dashes line in FIG. 5 may be provided in addition to the engine exhaust brake. However, the additional auxiliary brake device causes complication in structure of the brake system and also causes an increase in vehicle weight and cost.

SUMMARY OF THE INVENTION

It is a first object of the present invention to provide a brake device for a vehicle which may prevent overrun of an engine and damage of the engine even when a vehicle speed is excessively high during downhill running, for example.

It is a second object of the present invention to provide a brake device for a vehicle which may increase a vehicle speed without the generation of overrun of the engine.

It is a third object of the present invention to provide a brake device for a vehicle which may be constructed simply in structure to suppress an increase in vehicle weight and cost.

It is a fourth object of the present invention to provide a brake device for a vehicle which may have the transmission be down-shifted and have the lockup clutch be disengaged automatically during downhill running at high speeds even when the operator fails to down-shift the gear range to thereby retard a vehicle speed properly by a large engine exhaust braking force with an increased effective vehicle speed without the generation of overrun of the engine, thus improving both the braking efficiency and the running efficiency.

It is a fifth object of the present invention to provide a brake device for a vehicle which may arbitrarily select the generation of a large braking force or a normal braking force.

It is a sixth object of the present invention to provide a brake device for a vehicle which may carry out a predetermined control only when the operator intentionally operates to brake the vehicle, wherein the transmission is automatically down-shifted to have the vehicle run at a proper speed and exhibit a large braking force, thereby improving a running feeling.

According to a first aspect of the present invention, there is provided in a vehicle including a Diesel engine, a service brake device, an engine exhaust brake device, a torque converter with a lockup clutch, a transmission and a shift lever; a brake device comprising engine speed detecting means, vehicle speed detecting means, shift lever position detecting means and a controller inputting signals from said engine speed detecting means, said vehicle speed detecting means and said shift lever position detecting means, wherein when a vehicle speed is in a range from a low speed set value to a high speed set value of an effective vehicle speed corresponding to a shift lever position, said lockup clutch is engaged by said controller, while when the vehicle speed is out of the range from said low speed set value to said high speed set value, said lockup clutch is disengaged by said controller.

With the arrangement of the first aspect, when the vehicle speed exceeds the effective vehicle speed corresponding to a shift lever position selected by a shift lever during downhill running, for example, the lockup clutch is automatically disengaged to thereby prevent the engine from overrunning and prevent the damage of the engine. Further, the effective vehicle speed may be increased without the generation of the engine overrunning.

According to a second aspect of the present invention, there is provided in a vehicle including a Diesel engine, a service brake device, an engine exhaust brake device, a torque converter with a lockup clutch, a transmission and a shift lever; a brake device comprising engine speed detecting means, vehicle speed detecting means, shift lever position detecting means, means for detecting operation of said engine exhaust brake device and a controller inputting signals from said engine speed detecting means, said vehicle speed detecting means and said shift lever position detecting means and said means for detecting operation of said engine exhaust brake device, wherein when a vehicle speed upon application of engine exhaust brake is lower than a low speed set value of an effective vehicle speed corresponding to a shift lever position, said lockup clutch is disengaged by said controller; and when said vehicle speed is in a range from said low speed set value to a high speed set value of said effective vehicle speed, said lockup clutch is engaged by said controller; and when said vehicle speed exceeds said high speed set value, said lockup clutch is disengaged, and said transmission is down-shifted to a just lower gear range by said controller.

With the arrangement of the second aspect, even when the operator fails to down-shift the transmission during downhill running at high speeds, the transmission is automatically down-shifted according to the detection signal from the means for detecting operation of the engine exhaust brake device, and the lockup clutch is automatically disengaged. Accordingly, the effective vehicle speed may be increased without the generation of engine overrunning, and the braking efficiency may be increased by the engine exhaust brake to thereby exhibit a large braking force. Further, the construction of the brake device may be made simple to thereby suppress an increase in vehicle weight and cost.

The brake device according to the second aspect of the present invention may include selecting means for selecting either of a condition where the detection signal from said means for detecting operation of said engine exhaust brake device is input to said controller or a condition where the detection signal from said means for detecting operation of said engine exhaust brake device is not input to said controller.

With this arrangement, the generation of a large braking force or a normal braking force may be arbitrarily selected by the selecting means.

According to a third aspect of the present invention, there is provided in a vehicle including a Diesel engine, a service brake device, an engine exhaust brake device, a torque converter with a lockup clutch, a transmission and a shift lever; a brake device comprising engine speed detecting means, vehicle speed detecting means, shift lever position detecting means, means for detecting operation of said service brake device and a controller inputting signals from said engine speed detecting means, said vehicle speed detecting means and said shift lever position detecting means and said means for detecting operation of said service brake device, wherein when a vehicle speed upon application of engine exhaust brake is lower than a low speed set value of an effective vehicle speed corresponding to a shift lever position, said lockup clutch is disengaged by said controller; and when said vehicle speed is in a range from said low speed set value to a high speed set value of said effective vehicle speed, said lockup clutch is engaged by said controller; and when said vehicle speed exceeds said high speed set value, said lockup clutch is disengaged, and said transmission is down-shifted to a just lower gear range by said controller.

With the arrangement of the third aspect, only when the operator operates the service brake device to intentionally brake the vehicle, the above-mentioned control is carried out. Accordingly, rapid deceleration against the intention of the operator may be prevented, thereby reducing deceleration shock and improving running feeling.

The brake device according to the third aspect may include delay means for delaying the control operation of said controller, wherein when a set time set by said delay means is elapsed after said detection signal from said means for detecting operation of said service brake device is input to said controller, said transmission is down-shifted to the just lower gear range by said controller.

With this arrangement, when the service brake device is instantaneously operated in adjusting a distance to another vehicle running ahead, for example, the above-mentioned control is not carried out. Instead, only when the operator strongly operates the service brake device, the above-mentioned control is carried out. Accordingly, the running feeling may be further improved.

Other objects and features of the invention will be more fully understood from the following detailed description and appended claims when taken with the accompanying drawings.

DETAILED DESCRIPTION OF THE PREFERRED EMBODIMENT

Figure 1:
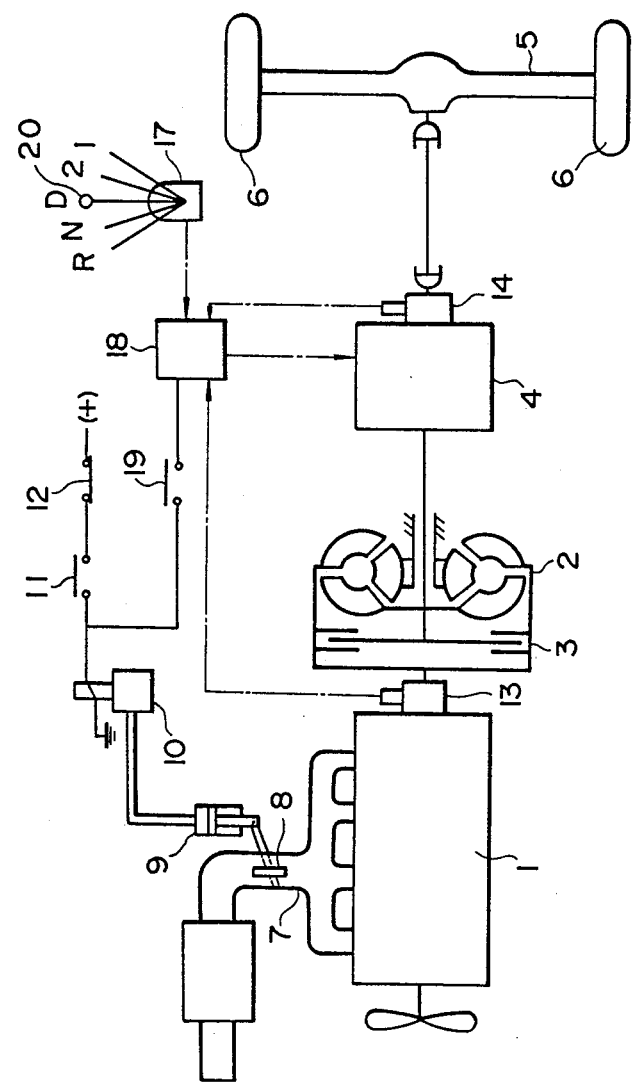
FIG. 1 is a schematic illustration of the preferred embodiment according to the present invention.
Figure 5:
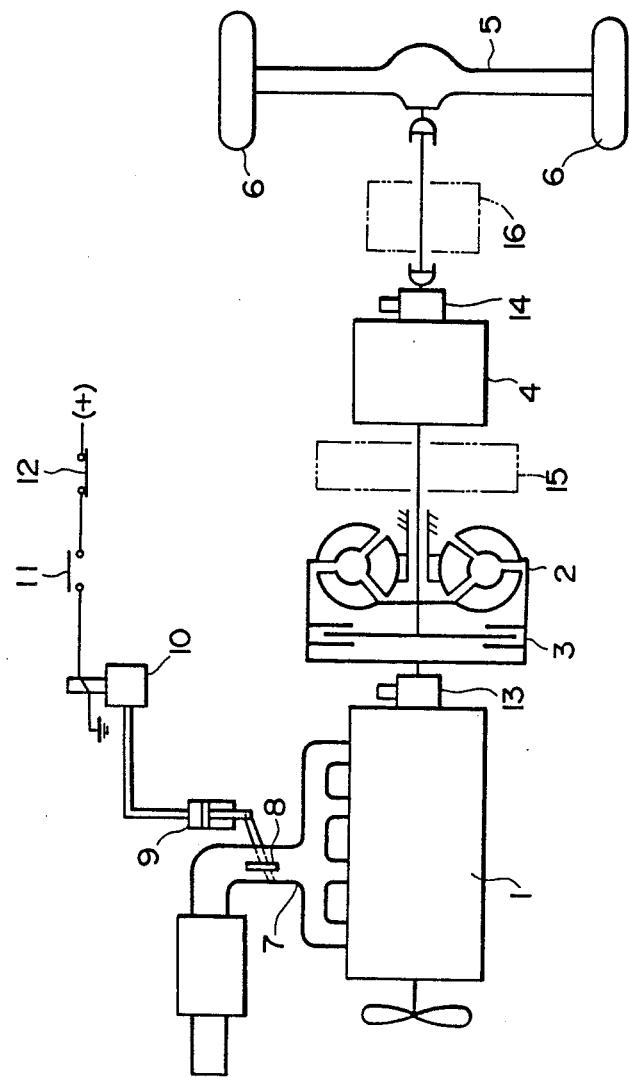
FIG. 5 is a schematic illustration of the prior art brake device.
Figure 6:
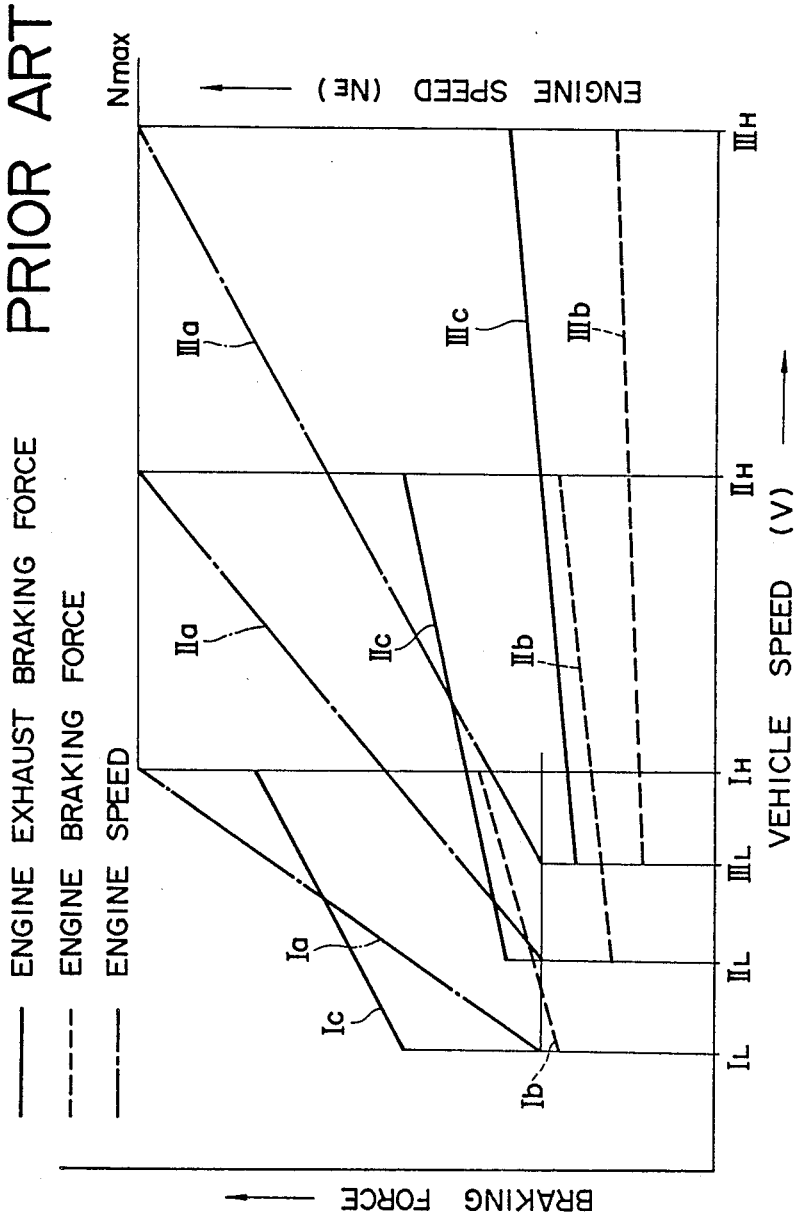
FIG. 6 is a graph similar to FIG. 2 in the prior art.

Referring to FIG. 1 in which the same reference numerals as in FIG. 5 designate the same parts, a power transmitting system comprises a Diesel engine 1, torque converter 2, lockup clutch 3, transmission 4, axle 5 and tires 6, and an engine exhaust brake device comprises an exhaust brake closing valve 8, valve operating air cylinder 9, magnetic valve 10, engine exhaust brake switch 11 and accelerator pedal switch 12. The power transmitting system and the engine exhaust brake device are connected to an engine speed sensor (detecting means) 13, vehicle speed sensor (detecting means) 14, shift lever sensor (detecting means) 17, controller 18 and hydraulic braking switch (selecting means) 19.

The controller 18 inputs signals from the switches 11, 12 and 19 and the sensors 13, 14 and 17, and conducts predetermined computation and processing. Then, the controller 18 outputs select signals to power shift clutches of the transmission 4, and also outputs an on/off signal through the transmission 4 to the lockup clutch 3.

When the engine 1 is driven under the condition where both the engine exhaust brake switch 11 and the hydraulic braking switch 19 are on, and a shift lever is operated, a lever position is detected by the shift lever position sensor 17, and a detection signal is input to the controller 18. The controller 18 outputs a select signal to any power shift clutch of the transmission 4 according to the shift lever position, thereby selecting a gear shift. Accordingly, a power of the engine 1 is transmitted through the torque converter 2, the power shift clutch of the transmission 4 and the axle 5 to the tires 6, thereby running a vehicle with a gear shift according to the shift lever position. During running of the vehicle, an engine speed $N_E$ and a vehicle speed V are controlled by controlling a depression amount of an accelerator pedal.

During running of the vehicle, the engine speed $N_E$ is detected by the engine speed sensor 13, and the vehicle speed V is detected by the vehicle speed sensor 14. Detection signals from these sensors are input to the controller 18. In the preferred embodiment, the vehicle speed sensor 14 detects a rotational speed of an output shaft of the transmission 4, and the controller 18 computes the vehicle speed V according to the rotational speed of the output shaft. The output shaft of the transmission 4 is mechanically connected through the power shift clutch to a turbine runner of the torque converter 2. A turbine runner speed $N_T$ of the torque converter 2 is computed by the controller 18 according to the vehicle speed V and the lever position detected by the shift lever position sensor 17.

Figure 3:
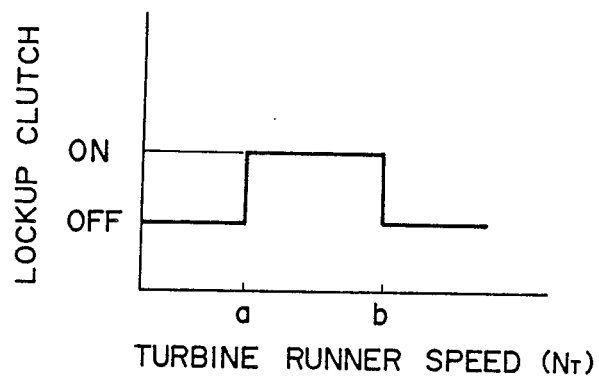
FIG. 3 is a graph of on/off timing of the lockup clutch according to the present invention.
Figure 7:
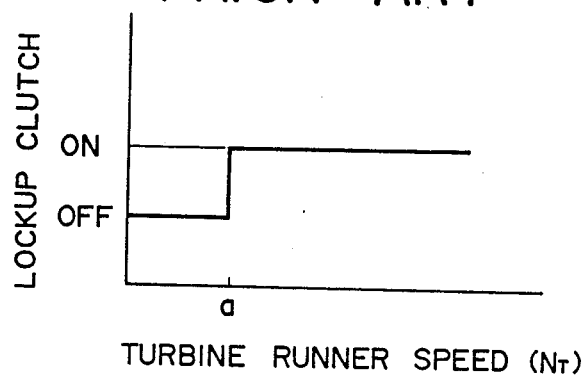
FIG. 7 is a graph similar to FIG. 3 in the prior art.

As shown in FIG. 3, when the turbine runner speed $N_T$ of the torque converter 2 is lower than a predetermined low speed set value a (at starting of the vehicle, for example), the lockup clutch 3 of the torque converter 2 is disengaged by the signal from the controller 18. Accordingly, slip is generated in the torque converter 2, and the power of the engine 1 is transmitted to the transmission 4 by the fluid transmission of the torque converter 2, thereby starting the vehicle without the generation of so-called engine stall.

Thereafter, when the vehicle speed V is gradually increased by depressing the accelerator pedal and selecting the shift lever 20, and the turbine runner speed $N_T$ of the torque converter 2 becomes the low speed set value a or more, the lockup clutch 3 is engaged by the signal from the controller 18. In selecting the shift lever 20, the lockup clutch 3 is once disengaged, and is then engaged. As a result, the power of the engine 1 is transmitted through the lockup clutch 3 to the transmission 4, thereby accelerating the vehicle properly with a gear range according to the shift lever position.

Figure 2:
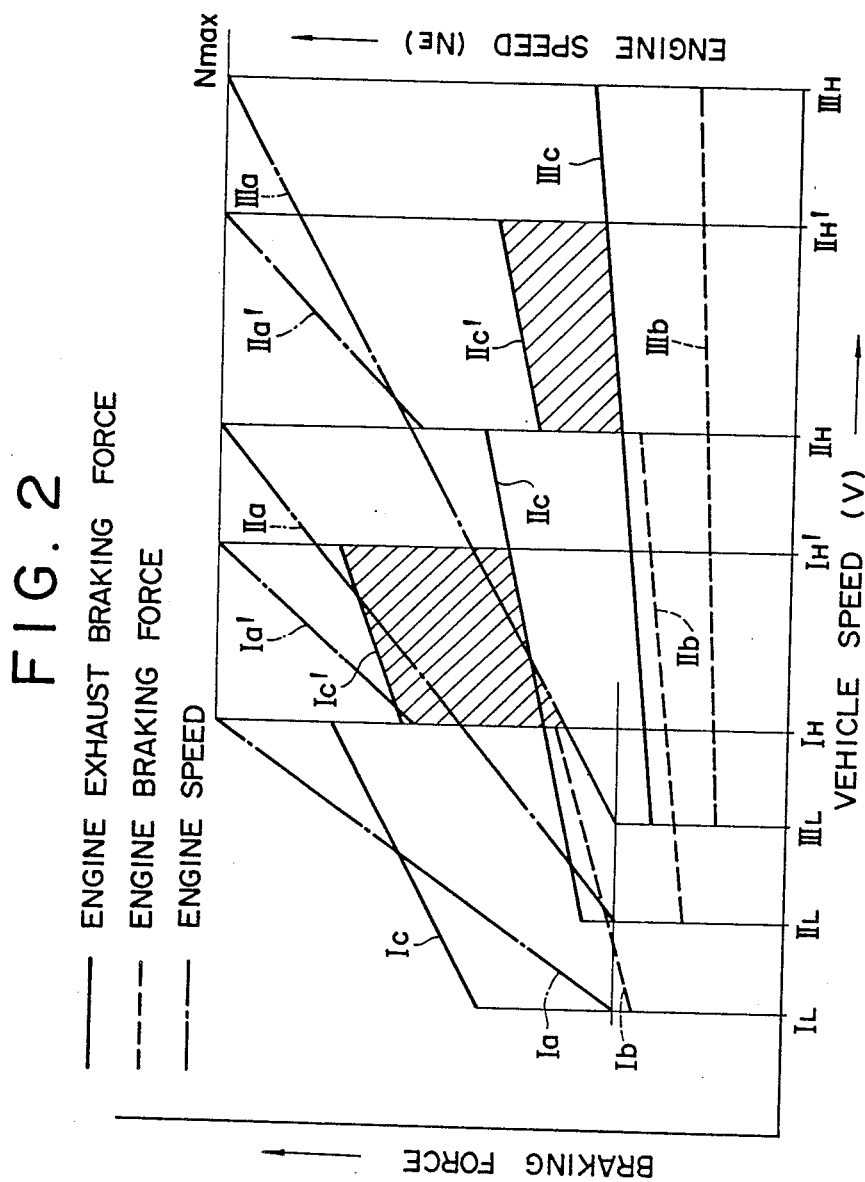
FIG. 2 is a graph of control characteristics among an engine speed, engine brake and exhaust brake in relation to a vehicle speed in each gear range.

FIG. 2 shows control characteristics of an engine speed, engine brake and exhaust brake in relation to a vehicle speed in the case that the transmission 4 is a three-speed transmission. Referring to FIG. 2, the engine speed $N_E$ is controlled to change as shown by chain lines Ia, IIa and IIIa corresponding to first to third speed ranges, and the engine braking force changes as shown by broken lines Ib, IIb and IIIb corresponding to first to third speed ranges, and the exhaust braking force changes as shown by solid lines Ic, IIc and IIIc corresponding to first to third speed ranges. In each speed range selected by the shift lever 20, when the shift lever 20 is in a position of "1" range (first speed), the vehicle speed V is controlled to change in a vehicle speed range of $I_L$–$I_H$. When the shift lever 20 is in a position of "2" range (first and second speeds), the vehicle speed V is controlled to change in a vehicle speed range of $II_L$–$II_H$. When the shift lever 20 is in a position of "D" range (first to third speeds), the vehicle speed V is controlled to change in a vehicle speed range of $III_L$–$III_H$.

When the depression force applied to the accelerator pedal is removed to make the engine be idly rotated during running of the vehicle, the engine exhaust brake switch 11 is turned on, and the accelerator switch 12 interlocking with an accelerator pedal is also turned on. As a result, the magnetic valve 10 is opened to supply a compressed air into the cylinder 9 and operate the engine exhaust brake closing valve 8. Accordingly, engine exhaust brake is applied to the engine.

In the operation of the engine exhaust brake during normal running, the vehicle speed V is controlled in the given speed range selected by the shift lever 20 (in the speed range of $I_L$–$I_H$ at the first speed position; in the speed range of $II_L$–$II_H$ at the second speed position; and in the speed range of $III_L$–$III_H$) as mentioned above. As the turbine runner speed $N_T$ is not less than the low speed set value a, and is not greater than the high speed set value b corresponding to the maximum permissible engine speed $N_{max}$ of the engine 1, the lockup switch 3 is engaged by the signal from the controller 18 (See FIG. 3). Accordingly, no slip is generated in the torque converter 2, and an engine brake is applied in each speed range in accordance with the broken lines Ib, IIb and IIIb as shown in FIG. 2, while an engine exhaust brake is also applied in each speed range in accordance with the solid lines Ic, IIc and IIIc as shown in FIG. 2. As apparent from FIG. 2, these braking forces are larger in the low speed gear range than in the high speed gear range (Ib>IIb>IIIb, Ic>IIc>IIIc).

When the vehicle speed V becomes excessively high during downhill running, for example, that is, when the vehicle speed V exceeds the maximum value $I_H$ at the first speed position, or it exceeds the maximum value $II_H$ at the second speed position, or it exceeds the maximum value $III_H$ at the third speed position, and the turbine runner speed $N_T$ exceeds the high speed set value b corresponding to the maximum permissible engine speed $N_{max}$ of the engine 1 (See FIG. 3), the lockup clutch 3 is automatically disengaged by the signal from the controller 18. Simultaneously, the transmission 4 is automatically shifted down to a just lower gear range. In this case, the power tends to be transmitted from the tires 6 to the engine 1 because of the high vehicle speed V. However, since the lockup clutch 3 is disengaged, the slip generated in the torque converter 2 suppresses the transmission of the power from the tires 6 to thereby prevent the overrun of the engine On the other hand, as the turbine runner in the torque converter 2 is mechanically connected through the power shift clutch or the like in the transmission 4 to the tires 6, the turbine runner is permitted to overrun relative to the pump impeller on the engine 1 side. That is, the maximum vehicle speed $I_H$ at the first speed position may be extended to a vehicle speed $I_H'$ at an engine speed shown by a chain line Ia' lower than the permissible maximum engine speed $N_{max}$. Similarly, the maximum vehicle speed $II_H$ at the second speed position may be extended to a vehicle speed $II_H'$ at an engine speed shown by a chain line IIa'. Thus, even when the transmission 4 is shifted down to a just lower gear range, the effective vehicle speed range may be extended in each speed position without the generation of the overrun of the engine 1.

When the lockup clutch 3 is disengaged, and the transmission 4 is shifted down, the engine exhaust braking force as shown by a solid line Ic' or IIc' is just smaller than that as shown by the solid line Ic or IIc, respectively. However, since the slip in the torque converter 2 provides a hydraulic braking force, and the shift-down of the transmission 4 provides a large reduction ratio, the engine exhaust braking force can be remarkably higher than the case that a higher gear range is used at the same vehicle speed (See the solid line IIc or IIIc).

In this manner, a total auxiliary braking horsepower of the vehicle can be increased by an amount corresponding to hatched portions shown in FIG. 2 by applying an engine exhaust brake under the off-state of the lockup clutch 3 and selecting the gear range to a just lower speed range. Furthermore, as the slip in the torque converter 2 functions as a hydraulic braking horsepower, the total braking horsepower can be obtained as the sum of the hydraulic braking horsepower and an absorption horsepower of the engine exhaust brake, thus exhibiting a large braking force. Accordingly, even when the vehicle speed V is high during downhill running, for example, the vehicle can be efficiently braked without the generation of the overrun of the engine 1. Therefore, it is unnecessary to provide an auxiliary brake device such as a hydraulic brake device (hydraulic retarder) and an electric brake (eddy current retarder) as employed in the prior art.

Under the on-state of the switch 19, the hydraulic braking force owing to the slip in the torque converter 2 can be effectively utilized manually in the "1" range of the shift lever. Further, in the "D" or "2" range of the shift lever, the gear range is automatically changed from the third speed to the second speed or from the second speed to the first speed according to a vehicle speed, thereby obtaining a large engine exhaust braking force. Accordingly, the vehicle can be efficiently braked by the sum of the large engine exhaust braking force and the hydraulic braking force.

If the application of the engine exhaust brake always causes the shift-down of the transmission 4 and the disengagement of the lockup clutch 3 by the above-mentioned control, there occurs a certain problem such that even when the engine exhaust brake is temporarily applied so as to adjust a distance between the operator's vehicle and another vehicle running ahead, the vehicle speed is unintentionally reduced at a large reduction ratio by the shift-down of the transmission 4. Such a rapid deceleration with a deceleration shock is undesirable for the operator in running the vehicle.

Such a problem as mentioned above may be eliminated by preliminarily setting the hydraulic brake switch 19 to the off-state. In the off-state of the hydraulic brake switch 19, the lockup clutch 3 is on/off controlled by the controller 18 according to the vehicle speed V, that is, the turbine runner speed $N_T$. However, the shift-down of the transmission 4 is not effected even when the vehicle speed V becomes high, that is, the turbine runner speed $N_T$ exceeds the high speed set value b. Accordingly, the rapid deceleration against the operator's intention is not generated, thus improving a running feeling. In this case, the disengagement of the lockup clutch 3 at a high vehicle speed may not be carried out.

Figure 4:
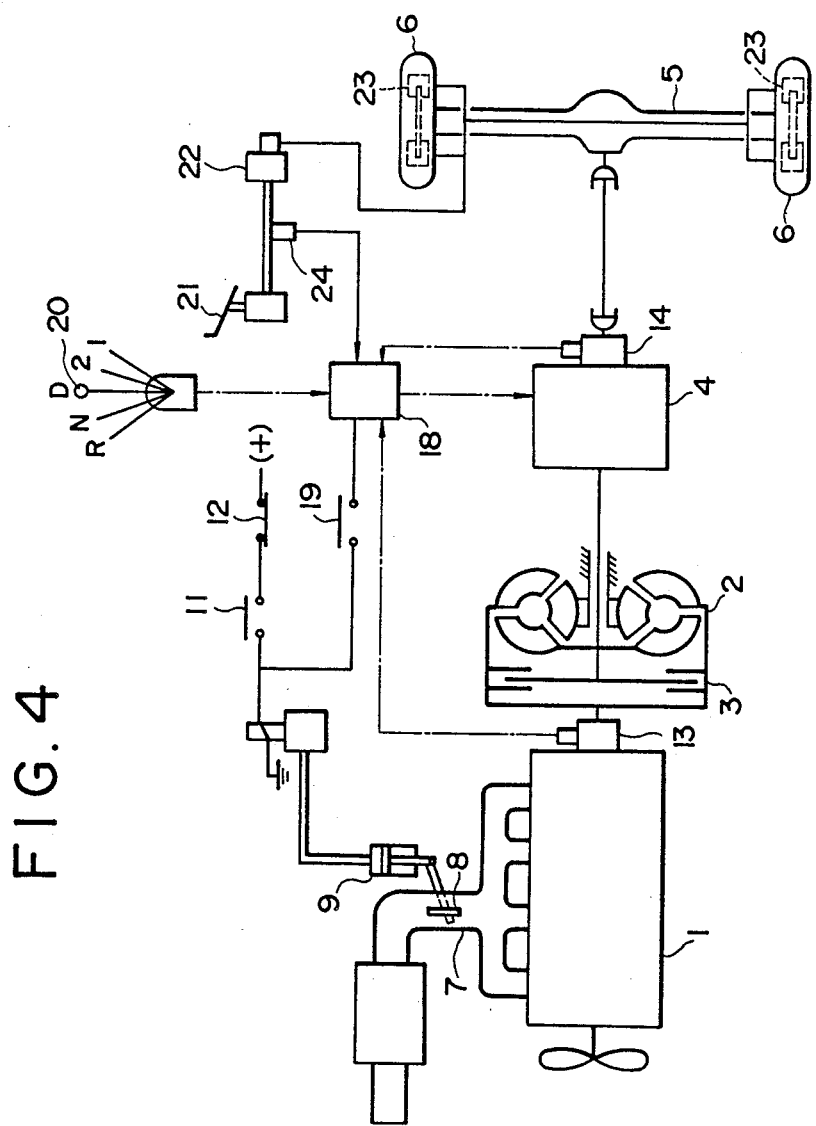
FIG. 4 is a schematic illustration of another preferred embodiment according to the present invention.

Referring next to FIG. 4 which shows another preferred embodiment of the present invention, the service brake device includes a service brake pedal 21, power cluster 22 and service brake 23. A detection switch (detecting means) 24 such as an air pressure switch for detecting the operation of the service brake device is associated with the service brake device. A detection signal from the detection switch 24 is input to the controller 18. The other construction is substantially the same as the construction of the previous preferred embodiment shown in FIG. 1.

So far as the service brake pedal 21 is not depressed during normal running, an off-signal from the switch 24 is input to the controller 18, and the same control as that mentioned previously in the first preferred embodiment. That is, when the turbine runner speed $N_T$ ranges from the low speed set value a to the high speed set value b, the lockup clutch 3 is engaged, while when the turbine runner speed $N_T$ is lower than the set value a or higher than the set value b, the lockup clutch 3 is disengaged. In each case, the vehicle speed V is controlled at the engine speed $N_E$ according to a gear range selected by the shift lever 20 and a depression amount of the accelerator pedal (See the chain lines Ia, IIa and IIIa in FIG. 2).

During such a normal running, when the depression force applied to the accelerator pedal is removed to make the engine be idly rotated, the engine brake (See the broken lines Ib, IIb and IIIb) and the engine exhaust brake (See the solid lines Ic, IIc and IIIc) according to the gear range selected above are applied with the lockup clutch 3 maintained engaged, thus decelerating the vehicle.

When the service brake pedal 21 is depressed during running of the vehicle, the service brake 23 is operated through the power cluster 22 to apply a service braking force to wheels of the tires 6. The service braking force is generated in accordance with a depression amount of the service brake pedal 21, thus positively braking the vehicle. In this case, the detection switch 24 is turned on by the depression of the service brake pedal 21, and the on-signal from the switch 24 is input to the controller 18. If the vehicle speed V is excessively high, that is, if the turbine runner speed $N_T$ is greater than the high speed set value b, the lockup clutch 3 is disengaged, and simultaneously the transmission 4 is shifted down to a just lower gear range (e.g., the third speed gear range to the second speed gear range). As a result, a large engine exhaust braking force is generated as previously mentioned. Thus, the vehicle is rapidly braked to reduce the excessively high vehicle speed by the total braking force as the sum of the engine braking force, the engine exhaust braking force and the service braking force.

During running of the vehicle at a normal vehicle speed, the lockup clutch 3 is maintained engaged irrespective of the application of the engine exhaust brake unless the service brake pedal 21 is depressed to turn on the switch 24. Accordingly, the shift-down of the transmission 4 is not effected to prevent unintentional rapid braking and thereby improve a running feeling. However, once the service brake pedal 21 is depressed to intentionally brake the vehicle, the switch 24 is turned on to disengage the lockup clutch 3 and shift down the transmission 4. As a result, a large braking force can be generated to brake the vehicle reliably and rapidly, thus improving the safety. Further, engine overrunning and damaging can be prevented to thereby improve the service life of the engine.

The air pressure switch 24 as the detecting means for detecting the operation of the service brake device may be replaced by any other sensors such as a pedal stroke sensor, pedal depression force sensor and service brake liquid pressure sensor. Furthermore, delay means such as timer means may be associated with the detecting means 24 or the controller 18, so as to modify the shift-down control and the brake control in accordance with various running feeling demanded by the operator.

In the second preferred embodiment as mentioned above, even when the service brake pedal 21 is temporarily lightly depressed so as to adjust a distance between the operator's vehicle and another vehicle running ahead, the switch 24 is turned on to disengage the lockup clutch 3 and shift down the transmission 4, resulting in the generation of a large braking force against the operator's intention in this case and degrading the running feeling. Such a problem may be eliminated by increasing a set pressure of the air pressure switch 24 or providing the delay means for delaying the control of the controller 18 in such a manner that the controller 18 may be operated after a predetermined time set by the delay means when the service brake pedal is depressed strongly or deeply. That is, only when the operator intentionally or positively brakes the vehicle, the controller 18 may be operated to further improve the running feeling.

The present invention is not limited to the above-mentioned preferred embodiment. For example, the fluidic brake switch 19 may be eliminated, and the signal from the exhaust brake switch 11 may be always input to the controller 18. Alternatively, the signal line between the exhaust brake switch 11 and the controller 18 may be eliminated so that the lockup clutch 3 is on/off controlled by the controller 18 according to the signals from the engine speed sensor 13, the vehicle speed sensor 14 and the shift lever position sensor 17. In this case, the down-shift operation may be manually conducted, and the overrun of the engine 1 can be similarly prevented.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a vehicle having a diesel engine, a transmission shiftable with a shift lever, a torque converter having a lockup clutch connected between said engine and said transmission, an engine exhaust brake and a service brake, a brake device comprising:
    engine speed detecting means;
    vehicle speed detecting means;
    shift lever position detecting means;
    means for detecting operation of said engine exhaust brake; and
    control means comprising means for receiving signals from said engine speed detecting means, from said vehicle speed detecting means, from said shift lever position detecting means and from said engine exhaust brake operation detecting means, means for disengaging said lockup clutch when the detected vehicle speed is lower than a low speed set value of an effective vehicle speed corresponding to the detected shift lever position and said engine exhaust brake is operated, means for engaging said lockup clutch when the detected vehicle speed is in a range between said low speed set value and a high speed set value of said effective vehicle speed, and means for disengaging said lockup clutch and down shifting said transmission by one gear range when the detected vehicle speed exceeds said high speed set value.

2. In the vehicle of claim 1, selecting means for selectively preventing said control means from receiving an engine exhaust brake detection signal.

3. In a vehicle having a diesel engine, a transmission shiftable with a shift lever, a torque converter having a lockup clutch connected between said engine and said transmission, an engine exhaust brake and a service brake, a brake device comprising:
    engine.speed detecting speed;
    vehicle speed detecting means;
    shift lever position detecting means;
    means for detecting operation of said engine exhaust brake;
    means for detecting operation of said service brake; and
    control means comprising means for receiving signals from said engine speed detecting means, from said vehicle speed detecting means, from said shift lever position detecting means, from said engine exhaust brake detecting means, and from said service brake operation detecting means, means for disengaging said lockup clutch when the detected vehicle speed is lower than a low speed set value of an effective vehicle speed corresponding to the detected shift lever position and said engine exhaust brake is operated, means for engaging said lockup clutch when the detected vehicle speed is in a range between said low speed set value and a high speed set value of said effective vehicle speed, and means for disengaging said lockup clutch and down shifting said transmission by one gear range when the detected vehicle speed exceeds said high speed set value.

4. In the vehicle of claim 3, delay means for delaying said down shifting of said transmission by a set time after detecting operation of said service brake.

* * * * *